(12) United States Patent
Wu et al.

(10) Patent No.: US 11,411,406 B2
(45) Date of Patent: Aug. 9, 2022

(54) METHOD, APPARATUS, AND STORAGE MEDIUM FOR CONTROLLING COMBINED HEAT AND POWER SYSTEM

(71) Applicants: TSINGHUA UNIVERSITY, Beijing (CN); STATE GRID JILINSHENG ELECTRIC POWER SUPPLY COMPANY, Jilin (CN); STATE GRID CORPORATION OF CHINA, Beijing (CN)

(72) Inventors: Wenchuan Wu, Beijing (CN); Bin Wang, Beijing (CN); Yong Sun, Jilin (CN); Hongbin Sun, Beijing (CN); Qinglai Guo, Beijing (CN); Chenhui Lin, Beijing (CN)

(73) Assignees: TSINGHUA UNIVERSITY, Beijing (CN); STATE GRID JILINSHENG ELECTRIC POWER SUPPLY COMPANY, Jilin (CN); STATE GRID CORPORATION OF CHINA, Beiting (CN)

( * ) Notice: Subject to any disclaimer, the term of this patent is extended or adjusted under 35 U.S.C. 154(b) by 472 days.

(21) Appl. No.: 16/664,053

(22) Filed: Oct. 25, 2019

(65) Prior Publication Data
US 2020/0321784 A1 Oct. 8, 2020

(30) Foreign Application Priority Data
Apr. 8, 2019 (CN) .......................... 201910275369.6

(51) Int. Cl.
*G06F 17/11* (2006.01)
*H02J 3/46* (2006.01)
*H02J 3/38* (2006.01)
*H02J 3/40* (2006.01)

(52) U.S. Cl.
CPC ................ *H02J 3/46* (2013.01); *G06F 17/11* (2013.01); *H02J 3/386* (2013.01); *H02J 3/40* (2013.01)

(58) Field of Classification Search
CPC ...... H02J 3/46; H02J 3/386; H02J 3/40; H02J 2300/28; H02J 3/466; H02J 3/28; H02J 2003/003; G06F 17/11; Y02E 10/76
See application file for complete search history.

(56) References Cited

U.S. PATENT DOCUMENTS

2020/0193346 A1* 6/2020 Elbsat .............. G06Q 10/06315
2021/0194245 A1* 6/2021 Tobin ...................... H02J 3/003

* cited by examiner

*Primary Examiner* — Daniel Cavallari
(74) *Attorney, Agent, or Firm* — Hodgson Russ LLP

(57) ABSTRACT

The present disclosure relates to a method, an apparatus and a storage medium for controlling a combined heat and power system, belonging to the field of power system technologies. The method discloses: establishing a decision model, the decision model including an objective function aiming to minimize a total cost of the first generators and the second generators, and constraints with respect to the first generators, the second generators and the heating exchange stations; solving the decision model to acquire operation states of the first generators, operation states of the second generators, and operations states of the heating exchange stations; and controlling the combined heat and power system, based on the operation states of the first generators, the operation states of the second generators, and the operations states of the heating exchange stations.

19 Claims, 1 Drawing Sheet

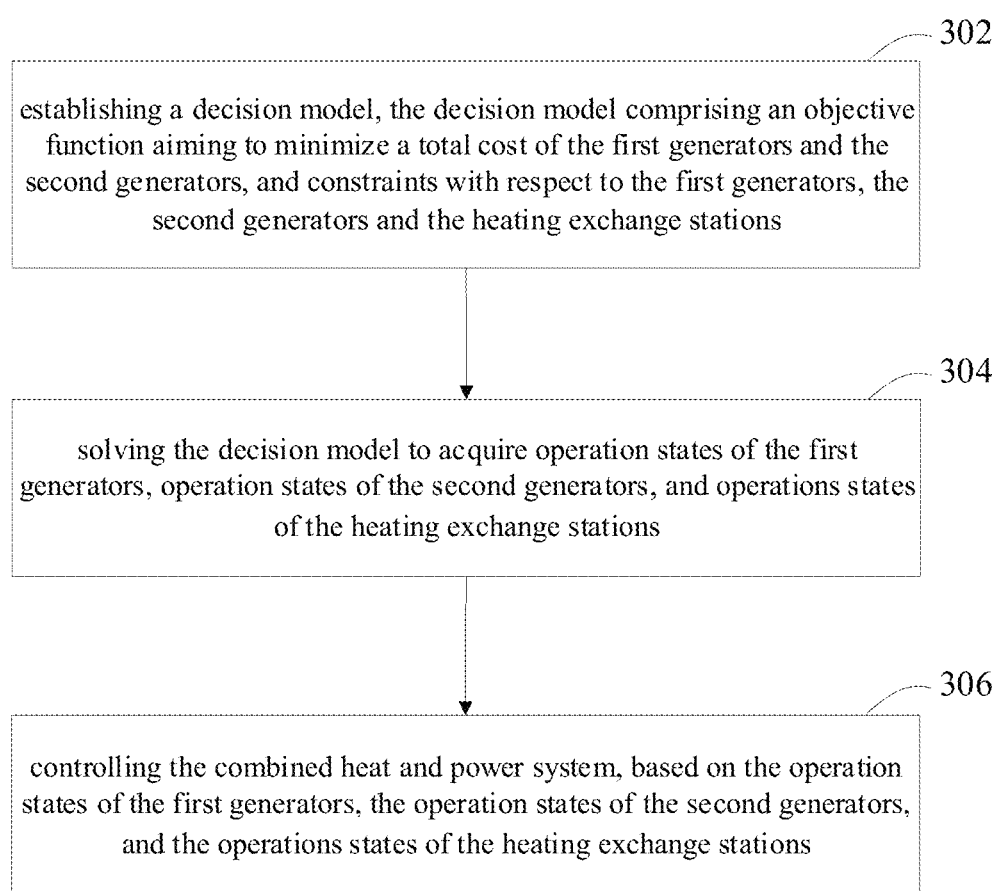

METHOD, APPARATUS, AND STORAGE MEDIUM FOR CONTROLLING COMBINED HEAT AND POWER SYSTEM

CROSS-REFERENCE TO RELATED APPLICATIONS

This application claims priority to Chinese Patent Application No. 201910275369.6, filed Apr. 8, 2019, the entire disclosure of which is incorporated herein by reference.

FIELD

The present disclosure relates to a method, an apparatus, and a storage medium for controlling a combined heat and power system, belonging to the field of power system technologies.

BACKGROUND

Combined heat and power techniques have great potential and benefits for improving energy efficiency, promoting renewable energy such as wind power, and reducing carbon emissions. However, a combined heat and power system is complex, and a conventional method for controlling the system may not ensure the security of supplying power and heat.

SUMMARY

The present disclosure provides a method for controlling a combined heat and power system. The system includes first generators, second generators, and heating exchange stations. The first generators are configured to output electric power, the second generators are configured to output electric power and heating power, and the heating exchange stations are configured to acquire the heating power from the second generators. The method includes: establishing a decision model, the decision model including an objective function aiming to minimize a total cost of the first generators and the second generators, and constraints with respect to the first generators, the second generators and the heating exchange stations; solving the decision model to acquire operation states of the first generators, operation states of the second generators, and operations states of the heating exchange stations; and controlling the combined heat and power system, based on the operation states of the first generators, the operation states of the second generators, and the operations states of the heating exchange stations.

The present disclosure provides an apparatus for controlling a combined heat and power system. The system includes first generators, second generators, and heating exchange stations. The first generators are configured to output electric power, the second generators are configured to output electric power and heating power, and the heating exchange stations are configured to acquire the heating power from the second generators. The apparatus includes: a processor; and a memory for storing instructions executable by the processor. The processor is configured to: establish a decision model, the decision model including an objective function aiming to minimize a total cost of the first generators and the second generators, and constraints with respect to the first generators, the second generators and the heating exchange stations; solve the decision model to acquire operation states of the first generators, operation states of the second generators, and operations states of the heating exchange stations; and control the combined heat and power system, based on the operation states of the first generators, the operation states of the second generators, and the operations states of the heating exchange stations.

The present disclosure provides a computer readable storage medium. The computer readable storage medium has a computer program stored thereon. The computer program is configured to implement the above method when executed by a processor.

BRIEF DESCRIPTION OF THE DRAWINGS

FIG. 1 is a flow chart illustrating a method for controlling a combined heat and power system according to embodiments of the present disclosure.

DETAILED DESCRIPTION

Reference will be made in detail to embodiments of the present disclosure. The embodiments described herein with reference to drawings are explanatory, illustrative, and used to generally understand the present disclosure. The embodiments shall not be construed to limit the present disclosure. The same or similar elements and the elements having same or similar functions are denoted by like reference numerals throughout the descriptions.

The present disclosure provides a method for controlling a combined heat and power system. The system includes first generators, second generators, and heating exchange stations. The first generators are configured to output electric power, the second generators are configured to output electric power and heating power, and the heating exchange stations are configured to acquire the heating power from the second generators. The method includes acts in the following blocks.

At block 302, a decision model is established. The decision model includes an objective function aiming to minimize a total cost of the first generators and the second generators, and constraints with respect to the first generators, the second generators and the heating exchange stations.

At block 304, the decision model is solved to acquire operation states of the first generators, operation states of the second generators, and operations states of the heating exchange stations.

At block 306, the combined heat and power system is controlled based on the operation states of the first generators, the operation states of the second generators, and the operations states of the heating exchange stations.

The embodiments of the method are described in detail below.

(1) A decision model is established.

(1-1) The objective function is determined. The objective function is denoted by a formula of:

$$\min \sum_{t \in T} \left( \sum_{i \in I^G} (C_i^G(p_{i,t}^G) + C_i^{GU} u_{i,t}^G + C_i^{GX} x_{i,t}^G + C_i^{GY} y_{i,t}^G) + \sum_{i \in I^H} (C_i^H(p_{i,t}^H, q_{i,t}^H) + C_i^{HU} u_{i,t}^H + C_i^{HX} x_t^H + C_i^{HY} y_{i,t}^H) \right)$$

where, T represents a time set, t represents a time numbering, i represents an element in the combined heat and power system; $I^G$ represents a set of the first generators, the first generators also refer to the conventional thermal power generating units; $p_{i,t}^G$ represents an electric power outputted by the first generator i at time t, $C_i^G(p_{i,t}^G)$ represents a variable operation cost function of the first generator i, $C_i^{GU}$ represents a cost of the first generator i without load, $u_{i,t}^G$ represents an operation state of the first generator i at time t, if $u_{i,t}^G=1$, it represents that the first generator i is operating, and if $u_{i,t}^G=0$, it represents that the first generator i is not operating, $C_i^{GX}$ represents a startup cost of the first generator i, $x_{i,t}^G$ represents a startup state of the first generator i at time t, if $x_{i,t}^G=1$, it represents that the first generator i is started up, and if $x_{i,t}^G=0$, it represents the first generator i is not started up, $C_i^{GY}$ represents a downtime cost of the first generator i, $y_{i,t}^G$ represents a downtime state of the first generator i at time t, if $y_{i,t}^G=1$, it represents that the first generator i is on downtime, and if $y_{i,t}^G=0$, it represent that the first generator i is not on downtime; $I^H$ represents a set of the second generators, the second generators also refer to the thermal power generating units for supplying the heat; $p_{i,t}^H$ represents an electric power outputted by the second generator i at time t, $q_{i,t}^H$ represents a heating power outputted by the second generator i at time t, $C_i^H(p_{i,t}^H, q_{i,t}^H)$ represents a variable operation cost function of the second generator i, $C_i^{HU}$ represents a cost of the second generator i without load, $u_{i,t}^H$ represents an operation state of the second generator i at time t, if $u_{i,t}^H=1$, it represents that the second generator i is operating, and if $u_{i,t}^H=0$, it represents that the second generator i is not operating, $C_i^{HX}$ represents a startup cost of the second generator i, $x_{i,t}^H$ represents a startup state of the second generator i at time t, if $x_{i,t}^H=1$, it represents that the second generator i is started up, and if $x_{i,t}^H=0$, it represents that the second generator i is not started up, $C_i^{HY}$ represents a downtime cost of the second generator i, $y_{i,t}^H$ represents a downtime state of the second generator i at time t, if $y_{i,t}^H=1$, it represents that the second generator i is on downtime, and if $y_{i,t}^H=0$, it represents that the second generator i is not on downtime.

(1-2) The constraints are determined. The constraints include: electric power system constraints, and heating system constraints.

(1-2-1) The electric power system constraints includes: a power balance constraint, an upper and lower power output constraint of generators, a ramp constraint, a spinning reserve constraint, a branch capacity constraint, a combination state logic constraint, and a minimum starting and stopping time constraint.

(1-2-1-1) The power balance constraint is denoted by a formula of:

$$\sum_{i \in I^G} p_{i,t}^G + \sum_{i \in I^H} p_{i,t}^H + \sum_{i \in I^W} p_{i,t}^W = \sum_{i \in I^D} P_{i,t}^D, \forall t \in T,$$

where, $I^W$ represents a set of wind turbine generators, $p_{i,t}^W$ represents an electric power outputted by the wind turbine generator i at time t, $I^D$ represents a set of loads, and $P_{i,t}^D$ represents a prediction load value of the load i at time t.

(1-2-1-2) The upper and lower power output constraint of generators is denoted by a formula $$u_{i,t}^G \underline{P_i^G} \le p_{i,t}^G \le u_{i,t}^G \overline{P_i^G}, \forall i \in I^G, \forall t \in T$$

$$KA_i^H p_{i,t}^H + KB_i^H q_{i,t}^H \le u_{i,t}^H KC_i^H, \forall i \in I^H, \forall t \in T$$

$$0 \le p_{i,t}^W \le \overline{P_{i,t}^W}, \forall i \in I^W, \forall t \in T$$

where, $\underline{P_i^G}$ represents a power lower limit of the first generator i, $\overline{P_i^G}$ is a power upper limit of the first generator i, and $KA_i^H$, $KB_i^H$ and $KC_i^H$ represent parameter vectors of polygon power output area of the second generator i, and $\overline{P_{i,t}^W}$ represents a maximum prediction power of the wind turbine generator i at time t.

(1-2-1-3) The ramp constraint is denoted by a formula of:

$$-SD_i^G - u_{i,t+1}^G(RG_i^G - SD_i^G) \le p_{i,t+1}^G - p_{i,t}^G, \forall i \in I^G,$$
$$\forall t \in T\ P_{i,t+1}^G - p_{i,t}^G \le SU_i^G + u_{i,t}^G(RU_i^G - SU_i^G),$$
$$\forall i \in I^G, \forall t \in T$$

$$-SD_i^H - u_{i,t+1}^H(RH_i^H - SD_i^H) \le p_{i,t+1}^H - p_{i,t}^H, \forall i \in I^H,$$
$$\forall t \in T\ P_{i,t+1}^H - p_{i,t}^H \le SU_i^H + u_{i,t}^H(RU_i^H - SU_i^H),$$
$$\forall i \in I^H, \forall t \in T,$$

where, $SD_i^G$ represents a stopping ramp ability of the first generator i $RD_i^G$ represents a downward ramp ability of the first generator i $SU_i^G$ represents a starting ramp ability of the first generator i, $RU_i^G$ represents an upward ramp ability of the first generator i, $SD_i^H$ represents a stopping ramp ability of the second generator i, $RD_i^H$ represents a downward ramp ability of the second generator i, $SU_i^H$ represents a starting ramp ability of the second generator i, and $RU_i^H$ represents an upward ramp ability of the second generator i.

(1-2-1-4) The spinning reserve constraint is denoted by a formula of:

$$\sum_{i \in I^G} \min\{RU_i^G, \overline{P_i^G} - p_{i,t}^G\} \ge SRU_t, \forall t \in T$$

$$\sum_{i \in I^G} \min\{RD_i^G, p_{i,t}^G - \underline{P_i^G}\} \ge SRD_t, \forall t \in T$$

where, $SRU_t$ represents an upward spinning reserve requirement of the power system at time t, and $SRD_t$ represents a downward spinning reserve requirement of the power system at time t.

(1-2-1-5) The branch capacity constraint is denoted by a formula of:

$$p_{j,t}^L = \sum_{i \in I^G} SF_{j-i}^G p_{i,t}^G + \sum_{i \in I^H} SF_{j-i}^H p_{i,t}^H + \sum_{i \in I^W} SF_{j-i}^W p_{i,t}^W - \sum_{i \in I^D} SF_{j-i}^D P_{i,t}^D,$$

$$\forall j \in I^L,$$

$$\forall t \in T$$

$$-P_j^L \le p_{j,t}^L \le P_j^L, \forall j \in I^L, \forall t \in T$$

where, $p_{j,t}^L$ represents a transmission power of a branch j at time t, $SF_{j-i}^G$ represents a power transfer distribution factor from the first generator i to the branch j, $SF_{j-i}^H$ represents a power transfer distribution factor from the second generator i to the branch j, $SF_{j-i}^W$, represents a power transfer distribution factor from the wind turbine generator i to the branch j, $SF_{j-i}^D$, represents a power transfer distribution factor from the load i to the branch j, $I^L$ represents a set of branches, and $P_j^L$ represents a transmission power upper limit of the branch j.

(1-2-1-6) The combination state logic constraint is denoted by a formula of:

$$u_{i,t}^G - u_{i,t-1}^G = x_{i,t}^G - y_{i,t}^G, \forall i \in I^G, \forall t \in T$$

$$u_{i,t}^H - u_{i,t-1}^H = x_{i,t}^H - y_{i,t}^H, \forall i \in I^H, \forall t \in T.$$

(1-2-1-7) The minimum starting and stopping time constraint is denoted by a formula of:

$$u_{i,t+1}^G - u_{i,t}^G \leq u_{i,t_u}^G, \forall t_u \in [=t+1,t+MU_i^G], \forall i \in I^G, \forall t \in T$$

$$u_{i,t}^G - u_{i,t+1}^G \leq 1 - u_{i,t_d}^G, \forall t_d \in [=t+1,t+MD_i^G], \forall i \in I^G, \forall t \in T$$

$$u_{i,t+1}^H - u_{i,t}^H \leq u_{i,t_u}^H, \forall t_u \in [=t+1,t+MU_i^H], \forall i \in I^H, \forall t \in T$$

$$u_{i,t}^H - u_{i,t+1}^H \leq 1 - u_{i,t_d}^H, \forall t_d \in [=t+1,t+MD_i^H], \forall i \in I^H, \forall t \in T,$$

where, $t_u$ and $t_d$ represent time indexes, $MU_i^G$ represents a minimum starting time of the first generator i, $MD_i^G$ represents a minimum stopping time of the first generator i, $MU_i^H$ represents a minimum starting time of the second generator i, and $MD_i^H$ represents a minimum stopping time of the second generator i.

(1-2-2) The heating system constraints includes a heat source constraint; a water pipe transmission temperature constraint; a heating exchange station constraint; and a heat load constraint.

(1-2-2-1) The heat source constraint is denoted by a formula of:

$$q_{i,t}^H C^W M_i^H (\tau_{i,t}^{HO} - \tau_{i,t}^{HI}), \forall i \in I^H, \forall t \in T,$$

where, $C^W$ represents a specific heat capacity of water, $M_i^H$ represents a node mass flow rate of the second generator i, $\tau_{i,t}^{HO}$ represents an outlet node temperature of the second generator i at time t, and $\tau_{i,t}^{HI}$ represents an inlet node temperature of the second generator i at time t.

(1-2-2-2) The water pipe transmission temperature constraint is denoted by a formula of:

$$\tau_{i,t}^{PO} - T_t^{AMB} = \left(\tau_{i,t-\Delta t_i^P}^{PI} - T_t^{AMB}\right) \exp(-K^{DS} \Delta t_i^P / C^W),$$

$$\tau_{i,t-\Delta t_i^P}^{PI} = (\Delta t_i^P - Rd(\Delta t_i^P)) \tau_{i,t-Rd(\Delta t_i^P)-1}^{PI} + (Rd(\Delta t_i^P) + 1 - \Delta t_i^P) \tau_{i,t-Rd(\Delta t_i^P)}^{PI},$$

$$\Delta t_i^P = P^W V_i^P / M_i^P,$$

$$\forall i \in I^P, \forall t \in T$$

$$\tau_{j,t}^{PI} = \tau_{i,t}^N,$$

$$\forall j \in I_i^{PF},$$

$$\forall i \in I^{ND},$$

$$\forall t \in T$$

$$\sum_{j \in I_i^{PT}} (M_j^P) \tau_{i,t}^N = \sum_{j \in I_i^{PT}} (M_j^P \tau_{j,t}^{PO}),$$

$$\forall i \in I^{ND},$$

$$\forall t \in T,$$

where, $\tau_{i,t}^{PO}$ represents an outlet node temperature of a heating water pipe i at time t, $T_t^{AMB}$ represents an exterior temperature at time t, $\Delta t_i^P$ represents a transmission delaying period of time of the heating water pipe i, $\tau_{i,t-\Delta t_i^P}^{PI}$ represents an inlet node temperature of the heating water pipe i at time $t-\Delta t_i^P$, $K^{DS}$ represents a heat dissipation coefficient, $Rd(\Delta t_i^P)$ represents that $\Delta t_i^P$ is rounded down, $P^W$ represents a density of water; $V_i^P$ represents a capacity of the heating water pipe i, $M_i^P$ represents a mass flow rate of the heating water pipe i, $I^P$ represents a set of the heating water pipes, $\tau_{j,t}^{PI}$ represents an inlet node temperature of the heating water pipe j at time t, $\tau_{i,t}^N$ represents a temperature of a node i in a heat supply network at time t, $I_i^{PF}$ represents a set of the water pipes taking the node i as a head node in the heat supply network, $I^{ND}$ represents a set of the nodes in the heat supply network, and $I_i^{PT}$ represents a set of the heating water pipes taking the node i as an end node in the heat supply network.

(1-2-2-3) The heating exchange station constraint is denoted by a formula of:

$$q_{i,t}^{EXON} = K_i^{EX} A_i^{EX} \frac{(\tau_{i,t}^{EXI1} - \tau_{i,t}^{EXO2}) + (\tau_{i,t}^{EXO1} - \tau_{i,t}^{EXI2})}{2},$$

$$\forall i \in I^{EX},$$

$$\forall t \in T$$

$$q_{i,t}^{EX} = u_{i,t}^{EX} q_{i,t}^{EXON}, \forall i \in I^{EX},$$

$$\forall t \in T$$

$$q_{i,t}^{EX} = C^W M_i^{EX1} (\tau_{i,t}^{EXI1} = \tau_{i,t}^{EXO1}),$$

$$\forall i \in I^{EX},$$

$$\forall t \in T$$

$$q_{i,t}^{EX} = C^W M_i^{EX2} (\tau_{i,t}^{EXO2} - \tau_{i,t}^{EXI2}),$$

$$\forall i \in I^{EX},$$

$$\forall t \in T,$$

where, $q_{i,t}^{EXON}$ represents a theoretical heating exchange power of the heating exchange station i at time t, $K_i^{EX}$ represents a heating exchange coefficient of the heating exchange station i, $A_i^{EX}$ represents a heating exchange area of the heating exchange station i, $\tau_{i,t}^{EXI1}$ represents a primary side inlet temperature of the heating exchange station i at time t, $\tau_{i,t}^{EXO2}$ represents a secondary side outlet temperature of the heating exchange station i at time t, $\tau_{i,t}^{EXO1}$ represents a primary side outlet temperature of the heating exchange station i at time t, $\tau_{i,t}^{EXI2}$ represents a secondary side inlet temperature of the heating exchange station i at time t, $I^{EX}$ represents a set of the heating exchange stations, $q_{i,t}^{EX}$ represents a heating exchange power of the heating exchange station i at time t, $u_{i,t}^{EX}$ represents an operation state of the heating exchange station i at time t, if $u_{i,t}^{EX}=1$, it represents that the heating exchange station i is operating, and if $u_{i,t}^{EX}=0$, it represents that the heating exchange station i is not operating, $M_i^{EX1}$ represents a primary side mass flow rate of the heating exchange station i, and $M_i^{EX2}$ represents a secondary side mass flow rate of the heating exchange station i.

(1-2-2-4) The heat load constraint is denoted by a formula of:

$$h_{i,t}^{ST} = K_i^{ST} (\tau_{i,t}^{EXI2} + \tau_{i,t}^{EXO2}), \forall i \in I^{EX}, \forall t \in T$$

$$h_{i,t+1}^{ST} - h_{i,t}^{ST} = (q_{i,t}^{EX} - q_{i,t}^{DS}) \Delta T, \forall i \in I^{EX}, \forall t \in T$$

$$q_{i,t}^{DS} = KA_i^{DS} h_{i,t}^{ST} + KB_i^{DS} T_t^{ITD} + KC_i^{DS}, \forall i \in I^{EX}, \forall t \in T$$

$$\underline{H_i^{ST}} \leq h_{i,t}^{ST} \leq \overline{H_i^{ST}}, \forall i \in I^{EX}, \forall t \in T$$

where, $h_{i,t}^{ST}$ represents a heat storage level of a heat load carried by the heating exchange station i at time t, $K_i^{ST}$ represents a parameter of the heat storage level of the heat load carried by the heating exchange station i, $q_{i,t}^{DS}$ represents a heat dissipation power of the heat load carried by the heating exchange station i at time t, $\Delta T$ represents a control resolution at a start-stop time, $KA_i^{DS}$, $KB_i^{DS}$ and $KC_i^{DS}$ represent parameters of the heat storage level of the heat load carried by the heating exchange station i, $T_t^{ITD}$ represents an outdoor comprehensive temperature at time t, $\underline{H_i^{ST}}$ represents a lower limit of the heat storage level of the heat load carried by the heating exchange station i, and $\overline{H_i^{ST}}$ represents an upper limit of the heat storage level of the heat load carried by the heating exchange station i.

(2) The decision model is solved to acquire operation states of the first generators, operation states of the second generators, and operations states of the heating exchange stations.

In an embodiment, equivalence transformation is performed on $q_{i,t}^{EX} = u_{i,t}^{EX} q_{i,t}^{EXON}$, $\forall i \in I^{EX}$, $\forall t \in T$ in the heating exchange station constraint through a big-M method to a formula of:

$$0 \leq q_{i,t}^{EX} \leq u_{i,t}^{EX} M, \forall i \in I^{EX}, \forall t \in T$$

$$0 \leq q_{i,t}^{EXON} - q_{i,t}^{EX} \leq (1 - u_{i,t}^{EX}) M, \forall i \in I^{EX}, \forall t \in T$$

where, M is a positive number. M may be 10000 which is large enough in the present disclosure.

The decision model is solved by a mixed integer quadratic programming solver.

(3) The combined heat and power system is controlled based on the operation states of the first generators, the operation states of the second generators, and the operations states of the heating exchange stations.

With the method, the start-stop control decision of the heating exchange stations is combined with the start-stop control decision of the conventional thermal power generating units, such that the heating system is reasonably involved in a peak regulation of the power system, thus avoiding security risk for supplying power and heat caused by the conventional decision based on experience, ensuring security of supplying power and heat, and improving wind power consumption of the power system. Comparing with the conventional start-stop control decision based on experience, the method provided by the present disclosure may avoid insufficient or excess heat supply in the heating system, ensuring the reliability for supplying power and heat, and implementing deep mining of thermal inertia and heat storage characteristics of the heating system.

Also, the present disclosure provides an apparatus for controlling a combined heat and power system. The system includes first generators, second generators, and heating exchange stations. The first generators are configured to output electric power, the second generators are configured to output electric power and heating power, and the heating exchange stations are configured to acquire the heating power from the second generators. The apparatus includes: a processor; and a memory for storing instructions executable by the processor. The processor is configured to implement the above method.

The present disclosure also provides a computer readable storage medium. The computer readable storage medium has a computer program stored thereon. The computer program is configured to implement the above method when executed by a processor.

The apparatus and the storage medium embodiments may refer to the method embodiments, which are omitted herein.

Any process or method described in a flow chart or described herein in other ways may be understood to include one or more modules, segments or portions of codes of executable instructions for achieving specific logical functions or steps in the process, and the scope of a preferred embodiment of the present disclosure includes other implementations, which should be understood by those skilled in the art.

The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system comprising processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer readable medium comprise but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs. The programs may be stored in a computer readable storage medium, and the programs comprise one or a combination of the steps in the method embodiments of the present disclosure when run on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable storage medium.

The storage medium mentioned above may be read-only memories, magnetic disks or CD, etc.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A method for controlling a combined heat and power system, wherein the system comprises first generators, second generators, and heating exchange stations, the first generators are configured to output electric power, the second generators are configured to output electric power and heating power, the heating exchange stations are configured to acquire the heating power from the second generators, and the method comprises:
    establishing a decision model, the decision model comprising an objective function aiming to minimize a total cost of the first generators and the second generators, and constraints with respect to the first generators, the second generators and the heating exchange stations;
    solving the decision model to acquire operation states of the first generators, operation states of the second generators, and operations states of the heating exchange stations; and
    controlling the combined heat and power system, based on the operation states of the first generators, the operation states of the second generators, and the operations states of the heating exchange stations.

2. The method of claim 1, wherein, the objective function is denoted by a formula of:

$$\min \sum_{t \in T} \left( \sum_{i \in I^G} (C^G(p_{i,t}^G) + C_i^{GU} u_{i,t}^G + C_i^{GX} x_{i,t}^G + C_i^{GY} y_{i,t}^G) + \sum_{i \in I^H} (C_i^H(p_{i,t}^H, q_{i,t}^H) + C_i^{HU} u_{i,t}^H + C_i^{HX} x_t^H + C_i^{HY} y_{i,t}^H) \right)$$

where, T represents a time set, t represents a time numbering, i represents an element in the combined heat and power system;

$I^G$ represents a set of the first generators, $p_{i,t}^G$, represents an electric power outputted by the first generator i at time t, $C_i^G(p_{i,t}^G)$ represents a variable operation cost function of the first generator i, $C_i^{GU}$ represents a cost of the first generator i without load, $u_{i,t}^G$ represents an operation state of the first generator i at time t, if $u_{i,t}^G=1$, it represents that the first generator i is operating, and if $u_{i,t}^G=0$, it represents that the first generator i is not operating, $C_i^{GX}$ represents a startup cost of the first generator i, $x_{i,t}^{G\ t}$ represents a startup state of the first generator i at time t, if $x_{i,t}^G=1$, it represents that the first generator i is started up, and if $x_{i,t}^G=0$, it represents the first generator i is not started up, $C_i^{GY}$ represents a downtime cost of the first generator i, $y_{i,t}^G$ represents a downtime state of the first generator i at time t, if $y_{i,t}^G=1$, it represents that the first generator i is on downtime, and if $y_{i,t}^G=0$, it represent that the first generator i is not on downtime;

$I^H$ represents a set of the second generators, $p_{i,t}^H$ represents an electric power outputted by the second generator i at time t, $q_{i,t}^H$ represents a heating power outputted by the second generator i at time t, $C_i^H(p_{i,t}^H, q_{i,t}^H)$ represents a variable operation cost function of the second generator i, $C_i^{HU}$ represents a cost of the second generator i without load, $u_{i,t}^H$, represents an operation state of the second generator i at time t, if $u_{i,t}^H=1$, it represents that the second generator i is operating, and if $u_{i,t}^H=0$, it represents that the second generator i is not operating, $C_i^{HX}$ represents a startup cost of the second generator i, $x_{i,t}^H$ represents a startup state of the second generator i at time t, if $x_{i,t}^H=1$, it represents that the second generator i is started up, and if $x_{i,t}^H=0$, it represents that the second generator i is not started up, $C_i^{HY}$ represents a downtime cost of the second generator i, $y_{i,t}^H$ represents a downtime state of the second generator i at time t, if $y_{i,t}^H=1$, it represents that the second generator i is on downtime, and if $y_{i,t}^H=0$, it represents that the second generator i is not on downtime.

3. The method of claim 2, wherein, the constraints comprise:
    electric power system constraints, and heating system constraints.

4. The method of claim 3, wherein, the electric power system constraints comprise:
    a power balance constraint; an upper and lower power output constraint of generators; a ramp constraint; a spinning reserve constraint; a branch capacity constraint; a combination state logic constraint; and a minimum starting and stopping time constraint,
    wherein the heating system constraints comprise:
    a heat source constraint; a water pipe transmission temperature constraint; a heating exchange station constraint; and a heat load constraint.

5. The method of claim 4, wherein the power balance constraint is denoted by a formula of:

$$\sum_{i \in I^G} p_{i,t}^G + \sum_{i \in I^H} p_{i,t}^H + \sum_{i \in I^W} p_t^W = \sum_{i \in I^D} P_{i,t}^D, \forall t \in T,$$

where, $I^W$ represents a set of wind turbine generators, $p_{i,t}^W$ represents an electric power outputted by the wind turbine generator i at time t, $I^D$ represents a set of loads, and $P_{i,t}^D$ represents a prediction load value of load i at time t.

6. The method of claim 4, wherein the upper and lower power output constraint of generators is denoted by a formula of:

$$u_{i,t}^G \underline{P_i^G} \leq p_{i,t}^G \leq u_{i,t}^G \overline{P_i^G}, \forall i \in I^G, \forall t \in T$$

$$KA_i^H p_{i,t}^H + KB_i^H q_{i,t}^H \leq u_{i,t}^H KC_i^H, \forall i \in I^H, \forall t \in T$$

$$0 \leq p_{i,t}^W \leq \overline{P_{i,t}^W}, \forall i \in I^W, \forall t \in T$$

where, $\underline{P_i^G}$ represents a power lower limit of the first generator i, $\overline{P_i^G}$ is a power upper limit of the first generator i, $KA_i^H$, $KB_i^H$ and $KC_i^H$ represent parameter vectors of polygon power output area of the second generator i, $I^W$ represents a set of wind turbine generators, $p_{i,t}^W$ represents an electric power outputted by the wind turbine generator i at time t, and $\overline{P_{i,t}^W}$ represents a maximum prediction power of the wind turbine generator i at time t.

7. The method of claim 4, wherein the ramp constraint is denoted by a formula of:

$$-SD_i^G - u_{i,t+}^G(RG_i^G - SD_i^G) \leq p_{i,t+1}^G - p_{i,t}^G, \forall i \in I^G,$$
$$\forall t \in T\ P_{i,t+1}^G - p_{i,t}^G \leq SU_i^G + u_{i,t}^G(RU_i^G - SU_i^G),$$
$$\forall i \in I^G, \forall t \in T$$

$$-SD_i^H - u_{i,t+}^H(RH_i^H - SD_i^H) \leq p_{i,t+1}^H - p_{i,t}^H, \forall i \in I^H,$$
$$\forall t \in T\ P_{i,t+1}^H - p_{i,t}^H \leq SU_i^H + u_{i,t}^H(RU_i^H - SU_i^H),$$
$$\forall i \in I^H, \forall t \in T$$

where, $SD_i^G$ represents a stopping ramp ability of the first generator i, $RD_i^G$ represents a downward ramp ability of the first generator i, $SU_i^G$ represents a starting ramp ability of the first generator i, $RU_i^G$ represents an upward ramp ability of the first generator i, $SD_i^H$ represents a stopping ramp ability of the second generator i, $RD_i^H$ represents a downward ramp ability of the second generator i, $SU_i^H$ represents a starting ramp ability of the second generator i, and $RU_i^H$ represents an upward ramp ability of the second generator i.

8. The method of claim 4, wherein, the spinning reserve constraint is denoted by a formula of:

$$\sum_{i \in I^G} \min\{RU_i^G, \overline{P}_i^G - p_{i,t}^G\} \geq SRU_t, \forall t \in T$$

$$\sum_{\in I^G} \min\{RD_i^G, p_{i,t}^G - \underline{P}_i^G\} \geq SRD_t, \forall t \in T$$

where, $\overline{P_i^G}$ is a power upper limit of the first generator i, $\underline{P}_i^G$ represents a power lower limit of the first generator i, $RU_i^G$ represents an upward ramp ability of the first generator i, $RD_i^G$ represents a downward ramp ability of the first generator i, $SRU_t$ represents an upward spinning reserve requirement of the power system at time t, and $SRD_t$ represents a downward spinning reserve requirement of the power system at time t.

9. The method of claim 4, wherein the branch capacity constraint is denoted by a formula of:

$$p_{j,t}^L = \sum_{i \in I^G} SF_{j-i}^G p_{i,t}^G + \sum_{i \in I^H} SF_{j-i}^H p_{i,t}^H + \sum_{i \in I^W} SF_{j-i}^W p_{i,t}^W - \sum_{i \in I^D} SF_{j-i}^D P_{i,t}^D,$$

$$\forall j \in I^L,$$

$$\forall t \in T$$

$$-P_j^L \leq p_{j,t}^L \leq P_j^L, \forall j \in I^L, \forall t \in T$$

where, $I^W$ represents a set of wind turbine generators, $p_{i,t}^W$ represents an electric power outputted by the wind turbine generator i at time t, $I^D$ represents a set of loads, $P_{i,t}^D$ represents a prediction load value of load i at time t, $p_{i,t}^L$ represents a transmission power of a branch j at time t, $SF_{j-i}^G$, represents a power transfer distribution factor from the first generator i to the branch j, $SF_{j-i}^H$, represents a power transfer distribution factor from the second generator i to the branch j, $SF_{j-i}^W$, represents a power transfer distribution factor from the wind turbine generator i to the branch j, $SF_{j-i}^D$, represents a power transfer distribution factor from the load i to the branch j, $I^L$ represents a set of branches, and $P_j^L$ represents a transmission power upper limit of the branch j.

10. The method of claim 4, wherein the combination state logic constraint is denoted by a formula of:

$$u_{i,t}^G - u_{i,t-1}^G = x_{i,t}^G - y_{i,t}^G, \forall i \in I^G, \forall t \in T$$

$$u_{i,t}^H - u_{i,t-1}^H = x_{i,t}^H - y_{i,t}^H, \forall i \in I^H, \forall t \in T.$$

11. The method of claim 4, wherein the minimum starting and stopping time constraint is denoted by a formula of:

$$u_{i,t+1}^G - u_{i,t}^G \leq u_{i,t_u}^G, \forall t_u \in [=t+1, t+MU_i^G], \forall i \in I^G, \forall t \in T$$

$$u_{i,t}^G - u_{i,t+1}^G \leq 1 - u_{i,t_d}^G, \forall t_d \in [=t+1, t+MD_i^G], \forall i \in I^G,$$
$$\forall t \in T$$

$$u_{i,t+1}^H - u_{i,t}^H \leq u_{i,t_u}^H, \forall t_u \in [=t+1, t+MU_i^H], \forall i \in I^H, \forall t \in T$$

$$u_{i,t}^H - u_{i,t+1}^H \leq 1 - u_{i,t_d}^H, \forall t_d \in [=t+1, t+MD_i^H], \forall i \in I^H,$$
$$\forall t \in T,$$

where, $t_u$ and $t_d$ represent time indexes, $MU_i^G$ represents a minimum starting time of the first generator i, $MD_i^G$ represents a minimum stopping time of the first generator i, $MU_i^H$ represents a minimum starting time of the second generator i, and $MD_i^H$ represents a minimum stopping time of the second generator i.

12. The method of claim 4, wherein the heat source constraint is denoted by a formula of $$q_{i,t}^H C^W M_i^H (\tau_{i,t}^{HO} - \tau_{i,t}^{HI}), \forall i \in I^H, \forall t \in T,$$

where, $C^W$ represents a specific heat capacity of water, $M_i^H$ represents a node mass flow rate of the second generator i, $\tau_{i,t}^{HO}$ represents an outlet node temperature of the second generator i at time t, and $\tau_{i,t}^{HI}$ represents an inlet node temperature of the second generator i at time t.

13. The method of claim 4, wherein the water pipe transmission temperature constraint is denoted by a formula of $$\tau_{i,t}^{PO} - T_t^{AMB} = \left(\tau_{i,t-\Delta t_i^P}^{PI} - T_t^{AMB}\right)\exp(-K^{DS}\Delta t_i^P / C^W),$$

$$\tau_{i,t-\Delta t_i^P}^{PI} = (\Delta t_i^P - Rd(\Delta t_i^P))\tau_{i,t-Rd(\Delta t_i^P)-1}^{PI} + (Rd(\Delta t_i^P) + 1 - \Delta t_i^P)\tau_{i,t-Rd(\Delta t_i^P)}^{PI},$$

$$\Delta t_i^P = P^W V_i^P / M_i^P,$$

$$\forall i \in I^P, \forall t \in T$$

$$\tau_{j,t}^{PI} = \tau_{i,t}^N,$$

$$\forall j \in I_i^{PF},$$

$$\forall i \in I^{ND},$$

$$\forall t \in T$$

$$\sum_{j \in I_i^{PT}} (M_j^P)\tau_{i,t}^N = \sum_{j \in I_i^{PT}} (M_j^P \tau_{j,t}^{PO}),$$

$$\forall i \in I^{ND},$$

$$\forall t \in T,$$

where, $\tau_{i,t}^{PO}$ represents an outlet node temperature of a heating water pipe i at time t, $T_t^{AMB}$ represents an exterior temperature at time t, $\Delta t_i^P$ represents a transmission delaying period of time of the heating water pipe i, $\tau_{i,t-\Delta t_i^P}^{PI}$ represents an inlet node temperature of the heating water pipe i at time $t-\Delta t_i^P$, $K^{DS}$ represents a heat dissipation coefficient, $Rd(\Delta t_i^P)$ represents that $\Delta t_i^P$ is rounded down, $P^W$ represents a density of water; $V_i^P$ represents a capacity of the heating water pipe i, $M_i^P$ represents a mass flow rate of the heating water pipe i, $I^P$ represents a set of the heating water pipes, $\tau_{j,t}^{PI}$ represents an inlet node temperature of the heating water pipe j at time t, $\tau_{i,t}^{N}$ represents a temperature of a node i in a heat supply network at time t, $I_i^{PF}$ represents a set of the water pipes taking the node i as a head node in the heat supply network, $I^{ND}$ represents a set of the nodes in the heat supply network, and $I_i^{PT}$ represents a set of the heating water pipes taking the node i as an end node in the heat supply network.

14. The method of claim 4, wherein, the heating exchange station constraint is denoted by a formula of:

$$q_{i,t}^{EXON} = K_i^{EX} A_i^{EX} \frac{(\tau_{i,t}^{EXI1} - \tau_{i,t}^{EXO2}) + (\tau_{i,t}^{EXO1} - \tau_{i,t}^{EXI2})}{2},$$

$\forall i \in I^{EX},$ $\forall t \in T$ $q_{i,t}^{EX} = u_{i,t}^{EX} q_{i,t}^{EXON}, \forall i \in I^{EX},$ $\forall t \in T$ $q_{i,t}^{EX} = C^W M_i^{EX1}(\tau_{i,t}^{EXI1} - \tau_{i,t}^{EXO1}),$ $\forall i \in I^{EX},$ $\forall t \in T$ $q_{i,t}^{EX} = C^W M_i^{EX2}(\tau_{i,t}^{EXO2} - \tau_{i,t}^{EXI2}),$ $\forall i \in I^{EX},$ $\forall t \in T,$ where, $q_{i,t}^{EXON}$ represents a theoretical heating exchange power of the heating exchange station i at time t, $K_i^{EX}$ represents a heating exchange coefficient of the heating exchange station i, $A_i^{EX}$ represents a heating exchange area of the heating exchange station i, $\tau_{i,t}^{EXI1}$, represents a primary side inlet temperature of the heating exchange station i at time t, $\tau_{i,t}^{EXO2}$ represents a secondary side outlet temperature of the heating exchange station i at time t, $\tau_{i,t}^{EXO1}$ represents a primary side outlet temperature of the heating exchange station i at time t, $\tau_{i,t}^{EXI2}$ represents a secondary side inlet temperature of the heating exchange station i at time t, $I^{EX}$ represents a set of the heating exchange stations, $q_{i,t}^{EX}$ represents a heating exchange power of the heating exchange station i at time t, $u_{i,t}^{EX}$ represents an operation state of the heating exchange station i at time t, if $u_{i,t}^{EX}=1$, it represents that the heating exchange station i is operating, and if $u_{i,t}^{EX}=0$, it represents that the heating exchange station i is not operating, $C^W$ represents a specific heat capacity of water, $M_i^{EX1}$ represents a primary side mass flow rate of the heating exchange station i, and $M_i^{EX2}$ represents a secondary side mass flow rate of the heating exchange station i.

15. The method of claim 4, wherein, the heat load constraint is denoted by a formula of:

$h_{i,t}^{ST} = K_i^{ST}(\tau_{i,t}^{EXI2} + \tau_{i,t}^{EXO2}), \forall i \in I^{EX}, \forall t \in T$ $h_{i,t+1}^{ST} - h_{i,t}^{ST} = (q_{i,t}^{EX} - q_{i,t}^{DS})\Delta T, \forall i \in I^{EX}, \forall t \in T$ $q_{i,t}^{DS} = KA_i^{DS} h_{i,t}^{ST} + KB_i^{DS} T_t^{ITD} + KC_i^{DS}, \forall i \in I^{EX}, \forall t \in T$ $\underline{H_i^{ST}} \leq h_{i,t}^{ST} \leq \overline{H_i^{ST}}, \forall i \in I^{EX}, \forall t \in T$ where, $h_{i,t}^{ST}$ represents a heat storage level of a heat load carried by the heating exchange station i at time t, $K_i^{ST}$ represents a parameter of the heat storage level of the heat load carried by the heating exchange station i, $\tau_{i,t}^{EXI2}$ represents a secondary side inlet temperature of the heating exchange station i at time t, $\tau_{i,t}^{EXO2}$ represents a secondary side outlet temperature of the heating exchange station i at time t, $I^{EX}$ represents a set of the heating exchange stations, $q_{i,t}^{EX}$ represents a heating exchange power of the heating exchange station i at time t, $q_{i,t}^{DS}$ represents a heat dissipation power of the heat load carried by the heating exchange station i at time t, $\Delta T$ represents a control resolution at a start-stop time, $KA_i^{DS}$, $KB_i^{DS}$ and $KC_i^{DS}$ represent parameters of the heat storage level of the heat load carried by the heating exchange station i, $T_t^{ITD}$ represents an outdoor comprehensive temperature at time t, $\underline{H_i^{ST}}$ represents a lower limit of the heat storage level of the heat load carried by the heating exchange station i, and $\overline{H_i^{ST}}$ represents an upper limit of the heat storage level of the heat load carried by the heating exchange station i.

16. The method according to claim 14, further comprises:
performing equivalence transformation on $q_{i,t}^{EX} = u_{i,t}^{EX} q_{i,t}^{EXON}, \forall i \in I^{EX}, \forall t \in T$ in the heating exchange station constraint through a big-M method to a formula of:

$0 \leq q_{i,t}^{EX} \leq u_{i,t}^{EX} M, \forall i \in I^{EX}, \forall t \in T$ $0 \leq q_{i,t}^{EXON} - q_{i,t}^{EX} \leq (1 - u_{i,t}^{EX})M, \forall i \in I^{EX}, \forall t \in T$ where, M is a positive number.

17. The method according to claim 1, wherein, solving the decision model is executed by a mixed integer quadratic programming solver.

18. An apparatus for controlling a combined heat and power system, wherein the system comprises first generators, second generators, and heating exchange stations, the first generators are configured to output electric power, the second generators are configured to output electric power and heating power, the heating exchange stations are configured to acquire the heating power from the second generators, and the apparatus comprises:
a processor; and
a memory for storing instructions executable by the processor,
wherein the processor is configured to:
establish a decision model, the decision model comprising an objective function aiming to minimize a total cost of the first generators and the second generators, and constraints with respect to the first generators, the second generators and the heating exchange stations;
solve the decision model to acquire operation states of the first generators, operation states of the second generators, and operations states of the heating exchange stations; and
control the combined heat and power system, based on the operation states of the first generators, the operation states of the second generators, and the operations states of the heating exchange stations.

19. A non-transient computer readable storage medium having a computer program stored thereon, wherein, the computer program is configured to implement the following acts when executed by a processor:
establishing a decision model, the decision model comprising an objective function aiming to minimize a total cost of the first generators and the second generators, and constraints with respect to the first generators, the second generators and the heating exchange stations;
solving the decision model to acquire operation states of the first generators, operation states of the second generators, and operations states of the heating exchange stations; and controlling the combined heat and power system, based on the operation states of the first generators, the operation states of the second generators, and the operations states of the heating exchange stations.

* * * * *